(12) United States Patent
Hourtane (10) Patent No.: US 9,616,772 B2
(45) Date of Patent: Apr. 11, 2017

(54) GROUND LEVEL POWER SUPPLY SYSTEM FOR A NON-GUIDED ELECTRIC VEHICLE AND CORRESPONDING METHOD OF USE

(71) Applicant: ALSTOM TRANSPORT TECHNOLOGIES, Levallois Perret (FR)

(72) Inventor: Jean-Luc Hourtane, Bouc Bel Air (FR)

(73) Assignee: ALSTOM TRANSPORT TECHNOLOGIES, Levallois Perret (FR)

( * ) Notice: Subject to any disclaimer, the term of this patent is extended or adjusted under 35 U.S.C. 154(b) by 79 days.

(21) Appl. No.: 14/667,566

(22) Filed: Mar. 24, 2015

(65) Prior Publication Data
US 2015/0274034 A1     Oct. 1, 2015

(30) Foreign Application Priority Data

Mar. 25, 2014   (FR) ...................................... 14 52525

(51) Int. Cl.
*B60M 1/00*        (2006.01)
*B60M 1/08*        (2006.01)
(Continued)

(52) U.S. Cl.
CPC ................. *B60M 1/08* (2013.01); *B60L 5/39* (2013.01); *B60M 1/30* (2013.01); *B60M 1/36* (2013.01); *B60M 3/04* (2013.01); *B60M 7/00* (2013.01)

(58) Field of Classification Search
CPC . B60M 1/08; B60M 1/30; B60M 1/36; B60M 3/04; B60M 7/00; B60L 5/39
See application file for complete search history.

(56) References Cited

U.S. PATENT DOCUMENTS 4,139,071 A * 2/1979 Tackett ..................... B60K 1/00
                                                      180/165
4,476,947 A * 10/1984 Rynbrandt ................ B60L 9/00
                                                      180/2.1
(Continued)

FOREIGN PATENT DOCUMENTS

| AU | 712902 B2 | 11/1999 |
| DE | 279792 A3 | 6/1990 |
| EP | 1582396 A1 | 10/2005 |

OTHER PUBLICATIONS

Search Report issued in French Application No. 1452525 on Feb. 20, 2015.

*Primary Examiner* — Jason C Smith
(74) *Attorney, Agent, or Firm* — Knobbe Martens Olson & Bear LLP (57) ABSTRACT

A ground level power supply system includes a live track capable of being brought to a supply voltage and a neutral track for the return current, with the live track being constituted of rectangular segments; a first voltage source capable of supplying a low supply voltage and a second voltage source capable of supplying a high supply voltage, each segment being connected by a controlled selector either to the first voltage source, or to the second voltage source; a speedometer capable of measuring the speed of a vehicle travelling over a section of a roadway equipped with the system; and a selection device capable of acquiring the vehicle speed measured by the speedometer, then comparing the speed measured with a threshold speed, and controlling the selector based on the results of the comparison.

8 Claims, 4 Drawing Sheets

(51) Int. Cl.
*B60M 1/36* (2006.01)
*B60M 7/00* (2006.01)
*B60L 5/39* (2006.01)
*B60M 1/30* (2006.01)
*B60M 3/04* (2006.01)

(56) References Cited

U.S. PATENT DOCUMENTS

| | | | | |
|---|---|---|---|---|
| 5,464,082 | A * | 11/1995 | Young | B60L 5/18 191/2 |
| 6,189,664 | B1 * | 2/2001 | Siciliano | B60M 1/103 191/14 |
| 6,209,693 | B1 * | 4/2001 | Siciliano | B60M 1/103 191/18 |
| 6,250,442 | B1 * | 6/2001 | Perraud | B60M 1/08 191/1 R |
| 6,471,020 | B1 * | 10/2002 | Hernandez | B60L 11/1816 191/2 |
| 8,220,568 | B2 * | 7/2012 | Stoicoviciu | B60K 25/08 180/165 |
| 8,365,888 | B2 * | 2/2013 | Re Fiorentin | B60L 5/42 191/13 |
| 8,493,024 | B2 * | 7/2013 | Kissel, Jr. | B60L 5/40 320/109 |
| 8,499,910 | B2 * | 8/2013 | Hubner | B60L 5/005 180/2.1 |
| 2011/0094840 | A1 * | 4/2011 | Sakita | B60L 5/005 191/2 |
| 2011/0106349 | A1 * | 5/2011 | Sakita | B60L 11/1801 701/22 |
| 2013/0037367 | A1 * | 2/2013 | Aguilar | B60L 5/36 191/22 C |
| 2014/0151175 | A1 * | 6/2014 | Vietzke | B60L 5/005 191/10 |
| 2014/0319927 | A1 * | 10/2014 | Cho | B60L 11/182 307/104 |
| 2015/0274034 | A1 * | 10/2015 | Hourtane | B60L 5/39 191/6 |
| 2015/0274035 | A1 * | 10/2015 | Hourtane | B60M 1/36 191/6 |

* cited by examiner

GROUND LEVEL POWER SUPPLY SYSTEM FOR A NON-GUIDED ELECTRIC VEHICLE AND CORRESPONDING METHOD OF USE

The invention relates to the field of ground level power supply systems for non-guided electric vehicles and corresponding methods of use thereof.

Electrically propelled vehicles (electric drive vehicles) are seen as an alternative to thermal propulsion vehicles in order to reduce the emission of greenhouse gases.

An electric vehicle includes a rechargeable battery and an electric motor, which is powered by the battery thereby serving to propel the vehicle.

For non-guided electric vehicles (that is to say, trucks, vans, private passenger cars and buses, etc) it is a known practice to charge the battery of the vehicle, when it is stopped by connecting the battery to a charging station, by means of an electric cable.

It has also been proposed to provide for the charging of the battery of a non guided electric vehicle while it is travelling. In order to do this, two types of systems are contemplated: inductive power supply systems and conductive power supply systems.

Among the conductive power supply systems, the document WO 2010 140964 discloses a roadway whose surface is provided with two grooves that are parallel to each other and extending longitudinally along the direction of the roadway. Inside each of the grooves runs one or more electric current carrying power supply rails.

In order to collect the electric current, the non-guided electric vehicle is provided with a pole whose end is capable of being inserted into the grooves of the roadway so as to come into electrical contact with the electric current carrying power supply rails.

The current carrying power supply rails are subdivided into longitudinal segments.

A segment is connected to a voltage source through a switch which is controlled based on a signal relating to the position of the vehicle to be supplied with power. In the above cited document, this position signal is generated upon the detection brought about by the vehicle, by means of a magnetic loop embedded in the roadway and running along the segment considered, of a tag of the RFID type (for "Radio Frequency Identification" as per the English terminology). Upon receipt of such a position signal, a control device closes the switch in a manner such that the segment considered is electrically connected to the voltage source.

The goal of the invention to provide an improved conduction type ground level power supply system.

The object of the invention relates to a ground level power supply system for a non-guided electric vehicle, that has a pair of power supply tracks including a conductor track referred to as phase conductor track capable of being brought to a supply voltage, and a conductor track referred to as neutral conductor track for the return current, with the neutral track running parallel to the phase track and the phase track consisting of a plurality of rectangular segments, disposed end to end, each segment being electrically isolated from its neighbors, characterized in that:

the system comprises a first voltage source capable of supplying a low supply voltage and a second voltage source capable of supplying a high supply voltage;
each segment is connected by controlled selector either to the first voltage source or to the second voltage source;
the system comprises at least one speedometer capable of measuring the instantaneous speed of a non-guided electric vehicle travelling over a section of a roadway equipped with the system; and
a selection device capable of acquiring the instantaneous speed of a vehicle measured by the speedometer, then comparing the speed measured with a threshold speed and controlling the or each selector based on the results of the comparison.

In accordance with particular embodiments, the system includes one or more of the following characteristic features, taken into consideration in isolation or according to any technically possible combination:

the selection device is such that if the measured speed is lower than the threshold speed, the or each selector is controlled in a manner such that each segment of the section is connected to the first source; and if the measured speed is higher than or equal to the threshold speed, the or each selector is controlled in a manner such that each segment of the section is connected to the second voltage source;

each segment of the phase conductor track is electrically connected to the controlled selector via a controlled switch, adapted to be switched by way of a controller depending on the presence of a vehicle directly above the segment considered or over an adjacent segment, so as to apply to the considered segment of the phase track, the supply voltage output by the voltage source selected by the selector;

the first voltage source is capable of outputting a voltage lower than 60 V and a power that is compatible with the operation of the auxiliary electrical drive of the vehicle to be powered, and the second voltage source is capable of outputting a high voltage and a power that is compatible with the operation of the principal electrical drive of the vehicle to be powered;

the speedometer is a speed measuring unit comprising of a computing unit connected to a speed sensor, the sensor being capable of generating a signal based on which the computing unit is capable of determining a measurement of the speed of a vehicle travelling over the section of the roadway;

the speedometer is a speed measurement system comprising of a computing unit connected to a plurality of antennas, each antenna being associated with a segment and having at least two lobes at a distance from each other along a longitudinal direction of the roadway, with each antenna being capable of picking up a signal transmitted by a suitable transmitter with which a contact shoe of the vehicle is fitted, and of generating a signal based on which the computing unit is capable of determining the instantaneous speed of the vehicle;

the antenna of the speedometer is asymmetrical in a manner such as to enable the determination of the direction of the instantaneous speed of the vehicle.

The object of the invention also relates to a method for using a ground level power supply system that is in conformity with the system here above, including the steps consisting of:

acquiring a measurement of the instantaneous speed of a vehicle;
comparing the speed measured with a threshold speed; and
if the measured speed is lower than the threshold speed, controlling the selector of each segment of a section of roadway over which the vehicle is travelling in order to ensure that it is connected to the first voltage source, capable of delivering a low supply voltage; or if the instantaneous speed is higher than or equal to the threshold speed, controlling the selector of each segment of a section of roadway over which the vehicle is travelling in order to ensure that it is connected to the second voltage source, capable of delivering a high supply voltage.

The invention will be better understood upon reading the description that follows of a particular embodiment, given purely by way of illustrative and non-limiting example, and with reference being made to the accompanying drawings in which.

Drawing on their experience gained in the field of conduction type ground level power supply systems, for guided electric vehicles, that is to say vehicles constrained to moving along tracks (in particular trams/streetcars moving along rail tracks), the applicant has developed the present ground level power supply system for non-guided electric vehicles.

Figure 1:
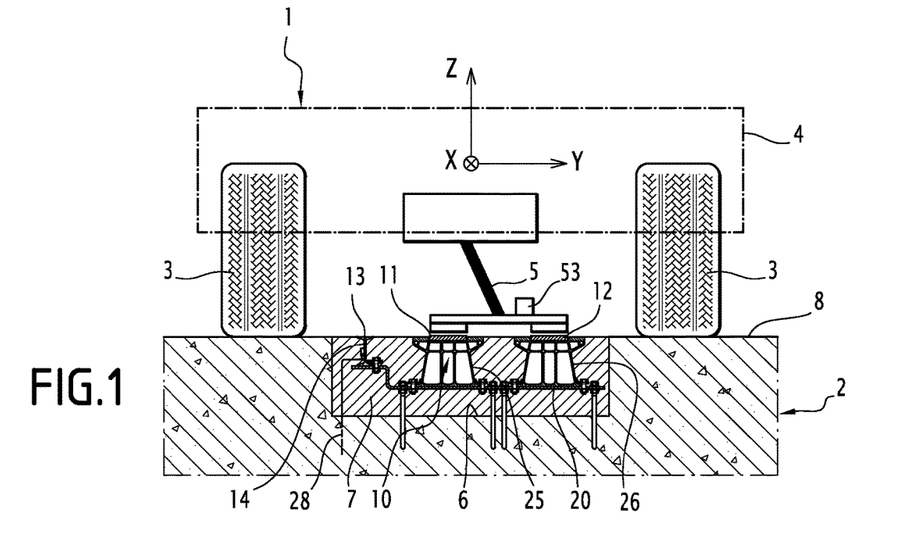
FIG. 1 is a rear view schematically representing a non-guided electric vehicle travelling on a roadway equipped with the ground level power supply system in accordance with the invention.
Figure 2:
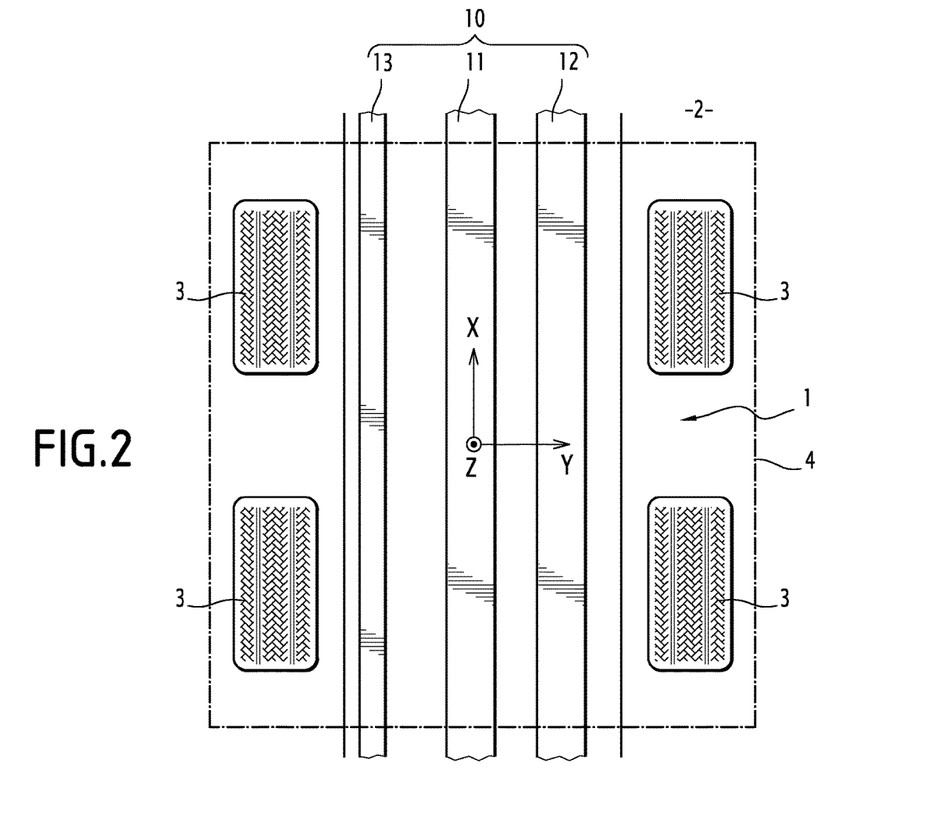
FIG. 2 is a top view of the illustration shown in FIG. 1.

In FIGS. 1 and 2, the illustration represents a car 1, as a non-guided electric vehicle, travelling on a roadway 2. Quite obviously, various different types of non-guided vehicles will be able to travel on the roadway 2 by using the ground level power supply system. Thus, the term non-guided electric vehicle includes cargo trucks, private passenger vehicles, private passenger buses, motorcycles, etc.

An XYZ coordinate system is associated in a conventional manner with the car 1: the X axis along the longitudinal direction, oriented towards the front; the Y axis along the transverse direction, oriented from left to right; and the Z axis along the vertical direction, oriented from the bottom towards the top.

The car 1 comprises a carriage body 4 and the wheels 3, some of which are steered wheels. The car 1 includes a steering system (not shown) that make it possible for a driver to change the angle of the steered wheels in the XY plane in a manner so as to steer the vehicle 1.

The car 1 includes a rechargeable battery and an electric motor (not shown). In traction, these principal electrical drive require a power of the order of 30 kW.

The car 1 is equipped with a current collector that provides the ability to collect electrical power during the course of travel of the car 1. The current collector are referenced in a general manner by the numeral 5 in FIG. 1.

The current collector 5 comprises of a contact shoe capable of come into sliding contact on a pair of current carrying power supply tracks of the ground level power supply system, which will now be described.

The roadway 2 includes a trench 6 within which is positioned the ground level power supply system, referenced in a general manner by the numeral 10.

Once the system 10 is placed in position in the trench 6, it is filled with concrete 7 in a manner such that the top surface 8 of the roadway 2 is continuous over the entire width thereof. The top surface 8 is substantially planar.

When in position, the system 10 has, flush with the surface 8 of the roadway 2:
  a phase conductor track 11, intended to be electrically connected to either a first source of electrical power, or to a second source of electrical power, or to the surrounding earth potential, as will be described here below;
  a neutral conductor track 12, intended to be electrically connected to a reference potential $V_{ref}$, for example, of 0 V;
  a protective conductor track 13 intended to be electrically connected to a ground potential $V_{ground}$.

The live track 11 is constituted of a plurality of segments (11.$i$ in FIG. 3) which, in the embodiment currently being contemplated, each present a width of 10 cm and a length of 22 m.

The segments are arranged end to end in order to form the live track 11.

The segments are electrically isolated from each other.

Advantageously, the neutral track 12 is fabricated using segments that are identical to those used for the live track 11. Thus, the track 12 is constituted of a plurality of segments (12.$i$ in FIG. 3) having a width of about 10 cm and a length of about 22 m.

The insulation between consecutive segments of the neutral track 12 here is of the same nature as that of the live track 11. However although segmentation is indeed needed for mechanical reasons (expansion), the level of dielectric strength between segments is not necessarily as high as between segments of the live track 11.

The neutral track 12 runs parallel to the live track 11 on a first side thereof. The lateral edge of the live track 11 and the lateral edge of the neutral track 12, which are positioned facing each other, are spaced apart at a first distance of 15 cm.

The protection track 13 is constituted by the top surface 14 of a profiled section sealed in the concrete 7 that fills the trench 6.

In the currently preferred embodiment, the profiled section 14 has a section formed in the shape of "I", of which the central core is disposed substantially vertically.

The protection track 13 is arranged in parallel to the live track 11, on a second side thereof. This second side is opposite the first side of the live track 11 that includes the neutral track 12.

The lateral edge of the live track 11 and the lateral edge of the protection track 13, which are positioned to be facing one another, are spaced apart at a second distance of 15 cm.

The function of the protection track 13 is to constitute on the second side, an electron collector for collecting electrons from a leakage current coming from the live conductor track 11.

The current leaks toward the first side are collected by the neutral track 12.

In the embodiment being contemplated, the width of the protection track 13 is about 5 cm.

With this particular selection of values for the transverse dimensions of the various different tracks and their mutual spacing, the ground level power supply system 10 has a total width of about 55 cm. The total width is chosen so as to remain less than the center to center spacing of the smallest non-guided electric vehicle that is likely to travel on the roadway 2 and use the system 10.

When the live track 11 is brought to a high potential, any leakage of current, for example due to the presence of a pool or a film of water on the surface 8 of the roadway, is collected on the first side by the neutral track 12 and on the second side by the protection track 13. This ensures that the portion of the surface of the roadway that has been brought to a high voltage potential is prevented from extending laterally beyond the width of the ground level power supply system 10. By selecting the total width of the ground level power supply system 10 less than the center to center spacing of the smaller vehicle that is authorized to travel on the roadway 2 and capable of using the system 10, it ensures that if a pedestrian is found to be laterally located on the first or the second side of a segment of the live track 11, but is beyond either the neutral track 12 or the protection track 13, the pedestrian will not be electrocuted if this segment is brought to a high voltage potential.

In order to facilitate the installation and implementation of the system 10, it comprises a support assembly for the various different tracks.

The support assembly includes a base 20 carrying two supporting profiled sections 25 and 26, that are identical to each other, and serving as the insulating support to the live conductor tracks 11 and neutral conductor tracks 12. These tracks are mechanically fixed on to the supporting profiled sections, but are electrically insulated from these latter.

The base 20 also carries the profiled sections 14.

An electrical cable 28, fastened to the core of the profiled sections 14, is designed to be buried in the roadway 2, advantageously beyond the trench 6, in a manner so as to bring the protection track 13 to the ground potential $V_{ground}$, and by electrical continuity the base 20.

The base 20 is provided with a plurality of tie rods 29, that are adjustable in height, adapted to be driven into the bottom of the trench 6 in a manner so as to preposition the ground level power supply system 10 in such a way that the level of the tracks are flush with the surface 8 of the roadway 2 to be built.

Thereafter, concrete is cast in a manner so as to embed the support assembly. The supporting profiled sections 25 and 26 as well as the profiled section 14 are then sealed into the layer of concrete 7. Advantageously, the state of the top surface of the concrete layer is worked so as to present an appropriate grip that is suitable for the tyres travelling on the roadway 2.

The pair of power supplying tracks, consisting of the live track 11 and the neutral track 12, as well as the protection track 13 are flush with the surface 8 of the roadway 2. More specifically, the tracks 11 and 12 protrude slightly above the surface 8 of the roadway 2, for example by a height of the order of a few millimetres, in particular equal to 2 mm. The track 13 is the level of the surface 8 of the roadway 2.

Figure 3:
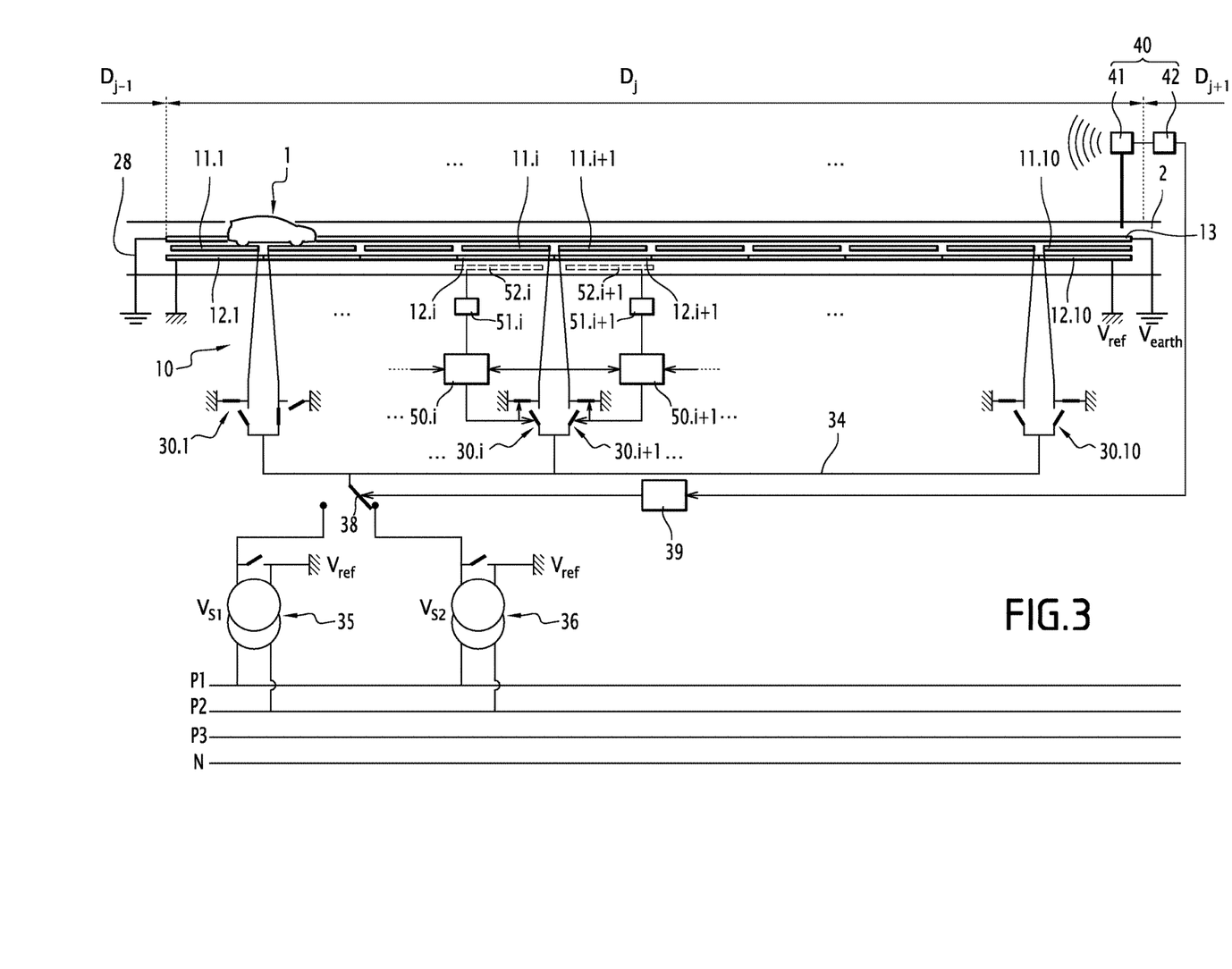
FIG. 3 is a schematic representation of a first embodiment of the ground level power supply system according to the invention.

A circuit diagram of the system 10 is given in FIG. 3.

The system 10 is divided into longitudinal sections. The section Dj is located between adjacent sections Dj−1 and Dj+1.

A section Dj corresponds to a plurality of segments 11.*i* of the live track 11. In FIG. 3, ten segments 11.*i* compose one section Dj.

Each segment of the plurality of segments 11.*i* of a section Dj is electrically connected, via a dedicated controlled switch 30.*i* to a power supply line 34.

The power supply line 34 is common to the various different segments 11.*i* of the section Dj considered.

The power supply line 34 of the section Dj is connected, via a selector 38, either to a first electrical power source 35, or to a second electrical power source 36 or to the surrounding ground potential.

The source 35 is capable for example, of delivering a low voltage $V_{s1}$ of 48 V DC. The source 35 is in fact a relay station that is capable of converting a three live current into a two live current.

The source 36 is capable for example, of delivering a high voltage $V_{s2}$ of 750 V DC. The source 36 is in fact a relay station that is capable of converting a three live current into a two live current.

The selector 38 is controlled by a selection device 39 that is capable of acquiring a measurement of speed output by a speedometer.

In the first embodiment, the speedometer is a speed measurement unit 40 equipping each section Dj of roadway.

The speed measurement unit 40 includes a speed sensor 41 connected to a computing unit 42. For each vehicle travelling on the section of roadway Dj, the sensor 41 is capable of generating a measurement signal, based on which the computing unit 42 is capable of determining a measurement of the instantaneous speed of the vehicle.

The selection device 39 includes:
- a measurement acquisition module capable of acquiring a measurement of speed as measured by the speed measuring unit 40;
- a comparator module capable of comparing the measurement of instantaneous speed acquired, to a threshold speed $V_0$, of 60 km/h for example; and
- a control unit that is capable, based on the result of the comparison, of switching the selector 38 either into a first position, that allows for connecting the power supply line 34 to the first source 35, or into a second position, that allows for connecting the power supply line 34 to the second source 36.

Each switch 30.*i* is controlled by a dedicated control device 50.*i* that is capable of acquiring a position signal output by a position measurement means comprising a computing unit 51.*i* connected to an antenna 52.*i*.

The antenna 52.*i* runs through the roadway 2, in order to form a loop around the corresponding segment 11.*i*, in a manner so as to detect the presence of a vehicle above the segment 11.*i*. More specifically, the antenna 52.*i* runs in the longitudinal channels provided in each of the lateral edges of the supporting profiled section 25 of the live track.

The vehicle is equipped with a contact shoe having a transmitter 53 (FIG. 1) capable of emitting, on a continuous and ongoing basis, a radio signal for example having a characteristic frequency of 500 kHz.

The signal collected by the antenna is applied as input to the computing unit 50.*i* which is capable of determining a measurement of the position of the vehicle and transmitting the same to the control device 50.*i*.

Upon detection of a car 1, the control device 50.*i* is capable of closing the switch 30.*i*.

Figure 4:
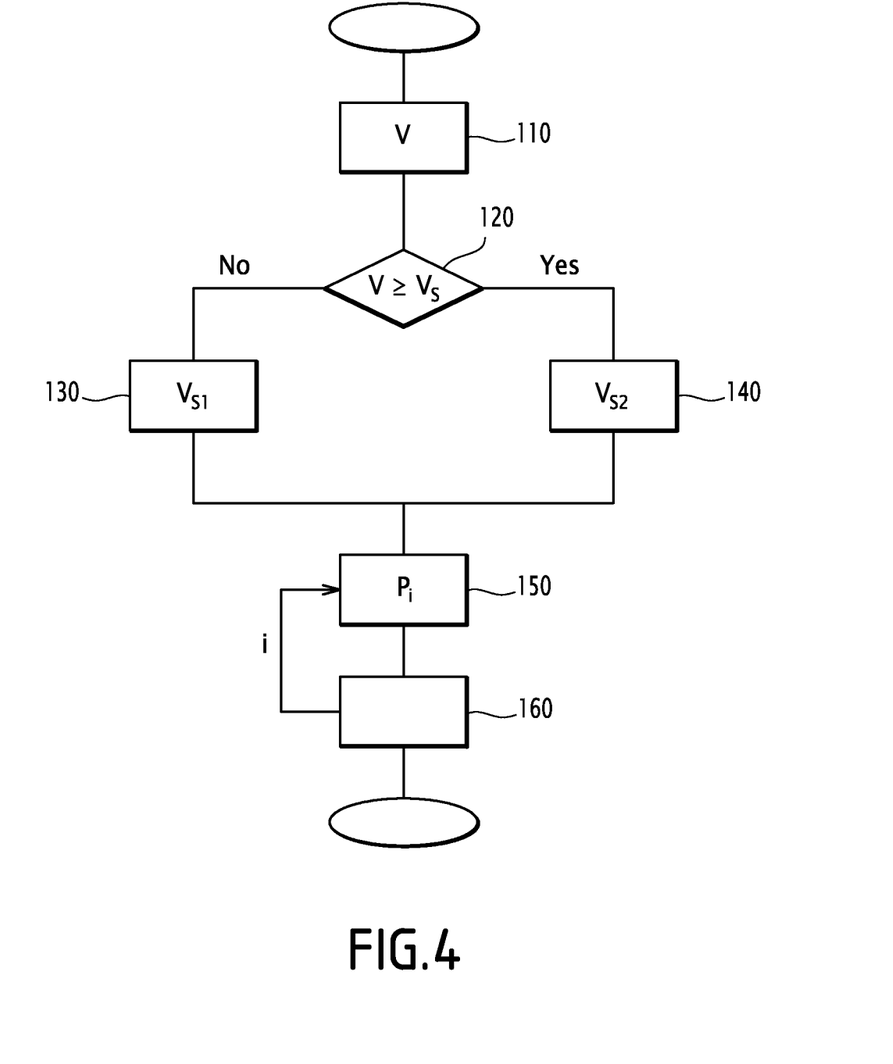
FIG. 4 is a schematic representation in block diagram form of a method of use of the system shown in FIG. 3.

The method of use of the system 10 that has just been described is presented here below.

When a car 1 enters the section Dj, the speed measurement unit 40 measures its instantaneous speed V (step 110).

The selection device 39 acquires this value of the instantaneous speed, provided as output from the speed measurement unit 40, and compares it to the threshold speed $V_0$ (step 120).

When the measured speed is lower than the threshold speed $V_0$, for all the vehicles travelling over the section, the selection device 39 switches the selector 38 into the first position in order to connect the power supply line 34 to the first source 35 (step 130).

On the other hand, when the speed measured for at least one of the vehicles travelling over the section under consideration is higher than or equal to the threshold speed $V_0$, the selection device 39 switches the selector 38 into the second position in order to connect the power supply line 34 to the second source 36 (step 140).

The car moves along the section Dj.

The controlled switches 30.*i* of the segment Dj are open by default.

When the position sensor 51.*i* detects the presence of the car 1 above the segment 11.*i* (step 140), the control device 50.*i* closes the switch 30.*i* in order to connect the segment 11.*i* to the power supply line 34 (step 150).

The 30.*i* switch remains closed as long as the position sensor detects the presence of the car.

The individual segments of the live track 11 are activated successively (loop over i in the FIG. 4) in synchronisation with the movement of the car 1 along the roadway 2.

The current collector 5 of the car 1, simultaneously rubbing on the live track 11 and neutral track 12, makes it possible to harvest a power supply current. A switch for switching the collector 5 is capable of determining the power supply voltage.

If the voltage measured is low, the power supply current is used in order to recharge or cause the operation of the auxiliary electrical drive of the vehicle.

If the voltage is high, the power supply current is used in order to recharge the battery or cause the operation of the engine of the vehicle.

The car 1 thus passes through the entire section Dj before proceeding on to the next section Dj+1. The process is then repeated over this new section.

As indicated here above, the potential to which the segments are brought is selected on the basis of the speed of the car 1.

If the car 1 is caught in a traffic jam and travels at low speeds, the electrical potential to which the live track 11 is brought is low and possibly zero, or in any case lower than a limit of 60 V beyond which a pedestrian runs the risk of being electrocuted. This low electrical potential provides the ability to transfer a reduced power to the car, which is compatible with the operation of auxiliary electrical drive thereof.

If the car 1 normally runs at a speed that is higher than the threshold speed which is associated with the section of the roadway over which the car is engaged, the electrical potential to which the live track 11 is brought is high. This high electrical potential provides the ability to transfer significant power to the car, which is compatible with the operation of the principal electrical drive of the vehicle.

It is to be noted that the segments 11.*i* are supplied with power succsessively, in such a way that one segment or possibly two segments are at the potential of 750 V at a given time instant. Thus, the portion of the surface of the roadway that is brought to a potential that is dangerous for a pedestrian, does not extend longitudinally beyond the length of one segment or two segments at the very most. That is why, the length of the segments is chosen so as to correspond substantially to the distance travelled during time for dodging in front of the vehicle or for accessing the conductor segment behind the vehicle, with the vehicle travelling at a speed of 60 km/h.

Thus the appropriate selection of the relevant voltage source on the basis of the speed of the vehicle to be supplied with power contributes to the safety of the system 10.

Numerous variant embodiments of the method of use of the ground level power supply system may possibly be envisaged.

Thus, when a plurality of vehicles are engaged simultaneously over the section Dj of the roadway, it is the vehicle that is travelling at the highest speed that triggers the switching of the selector from the first position to the second position, or vice versa as described here above.

Figure 5:
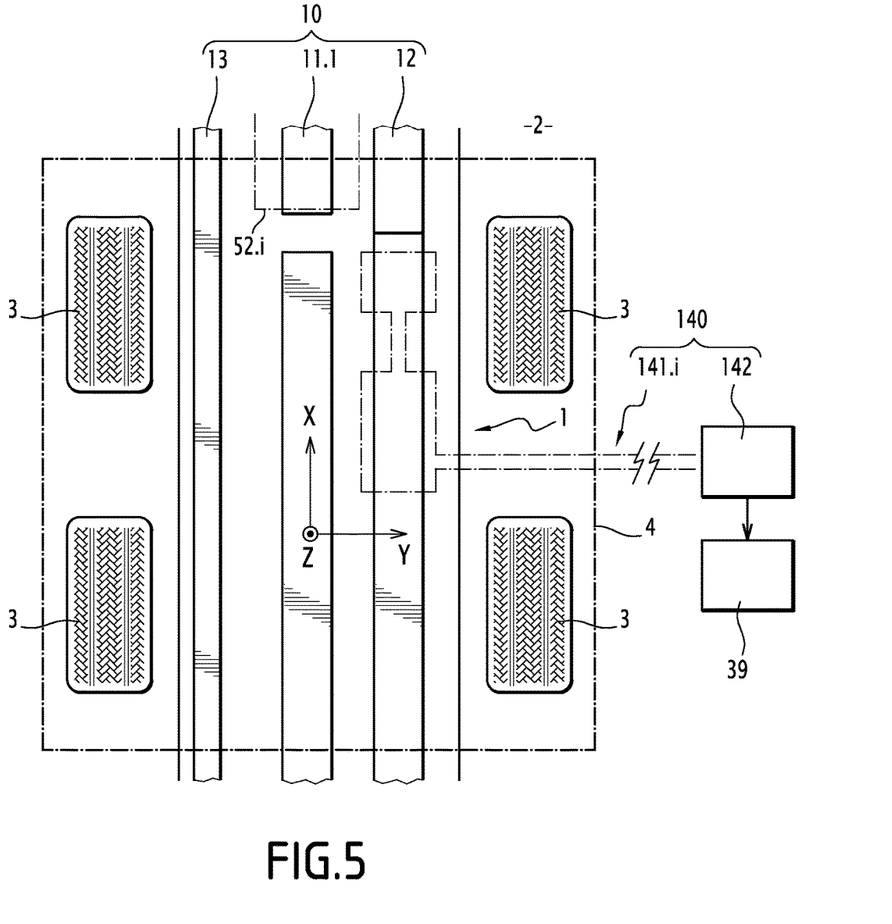
FIG. 5 is a schematic representation of a second embodiment of the ground level power supply system according to the invention.

A second embodiment will now be presented with reference made to FIG. 5.

In this figure, an element that is identical to an element of the first embodiment are referenced by the same reference numeral used in FIGS. 1 to 3 to designate this identical element.

In this second embodiment, the speedometer is a speed measurement system 140 having a plurality of antennas 141.*i* connected to a computing unit 142. Each antenna 141.*i* is associated with a segment 11.*i*.

An antenna 141.*i* forms a loop implanted in the ground, immediately upstream (along the direction of movement of the vehicles on the road) of the associated segment 11.*i*.

The antenna 141.*i* runs for example in the channels provided on the edges of the supporting profiled section of the neutral track.

The antenna shape is formed in a manner so as to define at least two lobes that are at a distance from each other separated by a predetermined interval along an axis of the antenna. The antenna is implanted in a manner such that the two lobes are arranged successively along the longitudinal direction of the roadway.

The first lobe has a length of about 1 metre, while the second lobe has a length of about 50 cm. The two lobes are separated by an interval of 50 cm.

The antenna is capable of receiving the signal transmitted by the transmitter 53 fitted to the contact shoe of a vehicle, when this contact shoe passes to within approximately 15 cm of the antenna 141.*i*. The corresponding signal is applied as input to the computing unit 142, which is capable of determining a measurement of the instantaneous speed of the vehicle.

The signal generated by the antenna 141.*i* corresponds to the signal transmitted by the transmitter 53 of the vehicle, convolved with a vehicle following distance function corresponding to the shape of the antenna 141.*i* and the instantaneous speed of the vehicle. In this present case, the vehicle following distance function includes a first high level, corresponding to the first lobe, a low intermediate level, corresponding to the interval between the first and second lobes, and a second high level, corresponding to the second lobe.

The first high level has a duration that is substantially twice as long as that of the second high level. Thus, the geometrical asymmetry of the antenna provides the ability to determine the direction of travel of the vehicle on the roadway.

The duration of each level makes it possible to determine with precision the instantaneous speed of the vehicle.

The speed calculated is passed to the selector 39 for selecting the level of voltage to be applied to the live track.

As a variant to this embodiment, the antenna may include more than two lobes spaced apart from each other spatially in a manner so as to determine an instantaneous speed of the vehicle while ensuring safety.

It should be noted that the value of the threshold speed has been determined as a function of the length of a segment. Indeed, the threshold speed, the dodge distance in front of the vehicle or access distance behind the vehicle is equal to the length of a track segment. Consequently, for a pedestrian the danger does not lie in the risk of an electrical shock when segment is being powered, but in the risk of being crushed by the vehicle itself. For a segment of 22 m and the minimum braking distances indicated by road safety rules, threshold speed is about 60 km/h.

What is claimed is:

1. A ground level power supply system for a non-guided electric vehicle, comprising:
    a pair of power supply tracks including a live conductor track capable of being brought to a supply voltage to supply power to a non-guided electric vehicle travelling over a section of a roadway equipped with the ground level power system, and a neutral conductor track for the return of a current supplied to the non-guided electric vehicle, with the neutral track running parallel to the live track and the live track consisting of a plurality of rectangular segments, disposed end to end, each segment being electrically isolated from adjacent segments thereof;
    a first voltage source capable of supplying a low supply voltage and a second voltage source capable of supplying a high supply voltage;
    a selector configured to connect each segment to either to the first voltage source or to the second voltage source;
    at least one speedometer configured to measure an instantaneous speed of the non-guided electric vehicle; and
    a selection device configured to acquire the instantaneous speed of the non-guided electric vehicle measured by the speedometer, compare the measured speed with a threshold speed, and control the selector based on the results of the comparison.

2. The power supply system according to claim 1, wherein the selection device is such that when the measured instantaneous speed is lower than a threshold speed, the or each selector is controlled in a manner such that each segment of the section is connected to the first voltage source and if the measured speed is higher than or equal to the threshold speed, the or each selector is controlled in a manner such that each segment of the section is connected to the second voltage source.

3. The system according to claim 1, wherein each segment of the live conductor track is electrically connected to the selector through a controlled switch, adapted to be actuated by way of a controller when a non-guided electric vehicle is present directly above the segment of the live track considered or over an adjacent segment thereof, so as to apply to the considered segment, a supply voltage output by the voltage source selected by the selector.

4. The system according to claim 1, wherein the first voltage source is capable of outputting a voltage lower than 60 V and a power that is compatible with the operation of an auxiliary electrical drive of the non-guided electric vehicle to be powered, and the second voltage source is capable of outputting a high voltage and a power that is compatible with the operation of a principal electrical drive of the non-guided electric vehicle to be powered.

5. The system according to claim 1, wherein the speedometer comprises a computing unit connected to a speed sensor, the speed sensor generating a signal, based on which the computing unit determines a measurement of the speed of the non-guided electric vehicle travelling over the section of a roadway.

6. The system according to claim 1, wherein the speedometer is a speed measuring system comprising a computing unit connected to a plurality of antennas, each antenna being associated with a single segment and having at least two lobes at a distance from each other along a longitudinal direction of the roadway, with each antenna picking up a signal transmitted by a suitable transmitter with which a contact shoe of the non-guided electric vehicle is provided, and generating a signal based on which the computing unit determines the instantaneous speed of the non-guided electric vehicle.

7. The system according to claim 6, wherein the antenna of the speedometer is asymmetrical determine the direction of the instantaneous speed of the non-guided electric vehicle.

8. A method for supplying power to a non-guided electric vehicle using a ground level power supply system in accordance with claim 1, comprising:
    acquiring a measurement of the instantaneous speed of the non-guided electric vehicle travelling over a section of a roadway equipped with the ground level power system from the speedometer;
    comparing the measured instantaneous speed with a speed threshold; and
    if the measured instantaneous speed is lower than the threshold speed, controlling the selector of each segment in order to ensure that it is connected to the first voltage source delivering a low supply voltage; or
    if the measured instantaneous speed is higher than or equal to the threshold speed, controlling the selector of each segment of the section in order to ensure that it is connected to the second voltage source delivering a high supply voltage.

* * * * *